(12) United States Patent
Wansner et al.

(10) Patent No.: US 9,698,445 B2
(45) Date of Patent: Jul. 4, 2017

(54) STORAGE ELEMENT INCLUDING MULTIPLE LITHIUM CELLS

(71) Applicant: Audi AG, Ingolstadt (DE)

(72) Inventors: Michael Wansner, Schrobenhausen (DE); Josef Winkler, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/404,847

(22) PCT Filed: May 25, 2013

(86) PCT No.: PCT/EP2013/001552
§ 371 (c)(1),
(2) Date: Dec. 1, 2014

(87) PCT Pub. No.: WO2013/178347
PCT Pub. Date: Dec. 5, 2013

(65) Prior Publication Data
US 2015/0155591 A1    Jun. 4, 2015

(30) Foreign Application Priority Data

Jun. 2, 2012 (DE) .......... 10 2012 011 083

(51) Int. Cl.
*H01M 10/04* (2006.01)
*H01M 10/052* (2010.01)
*H01M 2/10* (2006.01)

(52) U.S. Cl.
CPC ..... *H01M 10/0468* (2013.01); *H01M 2/1077* (2013.01); *H01M 10/052* (2013.01); *H01M 2220/20* (2013.01); *Y02E 60/122* (2013.01)

(58) Field of Classification Search
CPC ............ H01M 10/04; H01M 10/0468; H01M 10/052; H01M 2/1077
See application file for complete search history.

(56) References Cited

U.S. PATENT DOCUMENTS

| 5,422,200 A | 6/1995 | Hope et al. |
| 8,629,573 B2 | 1/2014 | Winkler et al. |
| 9,024,466 B2 | 5/2015 | Winkler et al. |

(Continued)

FOREIGN PATENT DOCUMENTS

| CN | WO2010/099906 A2 | 9/2010 | |
| DE | 102008059966 A1 * | 6/2010 | .......... H01M 2/1077 |

(Continued)

OTHER PUBLICATIONS

International Search Report issued by the European Patent Office in International Application PCT/EP2013/001552 on Jul. 17, 2013.

(Continued)

*Primary Examiner* — Karie O'Neill Apicella
(74) *Attorney, Agent, or Firm* — Henry M. Feiereisen LLC

(57) ABSTRACT

A storage element is disclosed including a plurality of lithium cells, which are arranged beside one another as a stack and are clamped via two clamping plates arranged at the ends, the plates being connected to each other via clamping elements, wherein the cell stack consists of prismatic cells inducing a housing and at least one pouch cell, which is accommodated in a cell holder, the external dimension of which corresponds to that of a housing of a prismatic cell.

6 Claims, 2 Drawing Sheets

(56) References Cited

U.S. PATENT DOCUMENTS

| | | | |
|---|---|---|---|
| 2009/0123829 A1* | 5/2009 | Kim | H01M 2/1022 |
| | | | 429/150 |
| 2011/0117426 A1 | 5/2011 | Choi et al. | |
| 2011/0189527 A1 | 8/2011 | Michelitsch et al. | |
| 2012/0156537 A1* | 6/2012 | Meintschel | B60L 11/1874 |
| | | | 429/99 |
| 2012/0214055 A1 | 8/2012 | Schaefer et al. | |
| 2012/0222907 A1 | 9/2012 | Schaefer et al. | |
| 2012/0282506 A1 | 11/2012 | Hohenthanner et al. | |
| 2013/0309538 A1 | 11/2013 | Pfeiffer et al. | |

FOREIGN PATENT DOCUMENTS

| | | |
|---|---|---|
| DE | 102009005124 | 7/2010 |
| DE | 102009037726 | 2/2011 |
| DE | 102009040147 | 3/2011 |
| DE | 102009043384 | 4/2011 |
| DE | 112009002351 | 1/2012 |
| WO | WO 2006/078103 | 7/2006 |
| WO | WO 2010/081087 | 7/2010 |
| WO | WO 2010/099906 | 9/2010 |
| WO | WO 2012/041588 | 4/2012 |

OTHER PUBLICATIONS

Chinese Search Report issued by the Chinese Patent Office in Chinese Application 201380029165.5.

* cited by examiner

STORAGE ELEMENT INCLUDING MULTIPLE LITHIUM CELLS

CROSS-REFERENCES TO RELATED APPLICATIONS

This application is the U.S. National Stage of International Application No. PCT/EP2013/001552, filed May 25, 2013, which designated the United States and has been published as International Publication No. WO 2013/178347 and which claims the priority of German Patent Application, Serial No. 10 2012 011 083.9, filed Jun. 2, 2012, pursuant to 35 U.S.C. 119(a)-(d).

BACKGROUND OF THE INVENTION

The invention relates to a storage element including multiple lithium cells which are arranged adjacent each other as stack and are clamped to each other via end side arranged clamping plates which are connected to each other via clamping elements.

In the recent past storage elements including multiple lithium cells have become more and more important. The advantage of such lithium based storage elements is on one hand a high energy density, which can be stored or used. In addition such storage elements also deliver a very constant voltage, wherein the degree of self discharge is very low. They also display no memory-effect, i.e., they can be charged and discharged almost indefinitely.

As mentioned, such storage elements are configured from multiple individual cells which are ordered into stacks, and which are clamped to each other via corresponding clamping plates and clamping elements. The clamping of this cell block is necessary in order to achieve the desired service life. To this end prismatic cells are usually used, i.e., the storage element, be it a battery or an accumulator, is constructed type pure. Such prismatic cells consist of a strong, relatively rigid housing in which the actual storage unit is arranged. It thus consist of only one type of cells, the individual cells are connected in series and/or parallel. For some applications, for example when using such a storage element in a motor vehicle, mixed batteries, i.e., with two different types of cells present in the cell block, may be useful depending on the demands placed on the storage element. Especially useful would be the combination of prismatic cells and pouch cells, i.e., flexible cells often also referred to as "coffee-bag" lithium cells. These cells consist of flexible walls formed by a film, i.e., they are in themselves flexible. As a result, however, they cannot be integrated into a clamped cell block.

SUMMARY OF THE INVENTION

The invention is thus based on the object to set forth a storage element which can be configured as clampable cell bock made of prismatic and pouch cells.

For solving this problem in a storage element of the aforementioned type it is provided that the cell stack is made of prismatic cells including a housing and at least one pouch cell, which is received in a cell holder, whose outer dimension corresponds to the outer dimension of the housing of a prismatic cell.

According to the invention a pouch cell is not integrated in the cell stack as such but rather via a cell holder in which it is arranged. This cell holder corresponds in its dimensions, i.e., its length, width and height, to the dimensions of a housing of a prismatic cell. Because this cell holder is sufficiently stable, like the housings of the prismatic cells, the cell block can consequently be clamped in the required manner. Thus regarding the dimensions of the individual cells, the cell block is quasi "type pure", even though it is composed of different types of cells.

The cell holder itself is preferably also configured as closed housing in which one or multiple pouch cells are received. The configuration as closed housing provides a sufficient stability. Because the dimensions of the housing correspond to a prismatic cell it is possible to not only arrange one pouch cell in such a housing but rather, since these pouch cells are very flat, also two or even three cells so that by using only one such housing-cell holder multiple pouch cells can be integrated in the stack.

In a refinement of the invention it is provided that in the cell holder the same contact elements are provided at the same positions as corresponding contact elements of a hosing of a prismatic cell. This makes it possible to utilize the same connection technology or the same connection planes for contacting the pouch cell-cell holder as well as the prismatic cells so that regarding the contacting, a homogenous construction results.

Further according to the invention a distance plate may be arranged between two cells and as the case may be between the respective outermost cells and a clamping plate. These distance plates stiffen the cell stack and regarding the clamping provide a sufficient stability so that also higher clamping forces can be applied. Here, a distance plate is preferably arranged between two respective cells independent of whether prismatic cells, a prismatic cell and a pouch cell present in the cell holder, or two cell holders are involved, as well as between the two end side cells and the directly adjoining clamping plate.

As clamping means clamping bands can be used, wherein generally however it is also possible the clamping via axial struts which as the case may be are laterally guided past the cell stack.

BRIEF DESCRIPTION OF THE DRAWING

Further advantages, features and details of the invention become apparent from the exemplary embodiment described in the following and by way of the drawings. It is shown in.

DETAILED DESCRIPTION OF PREFERRED EMBODIMENTS

Figure 1:
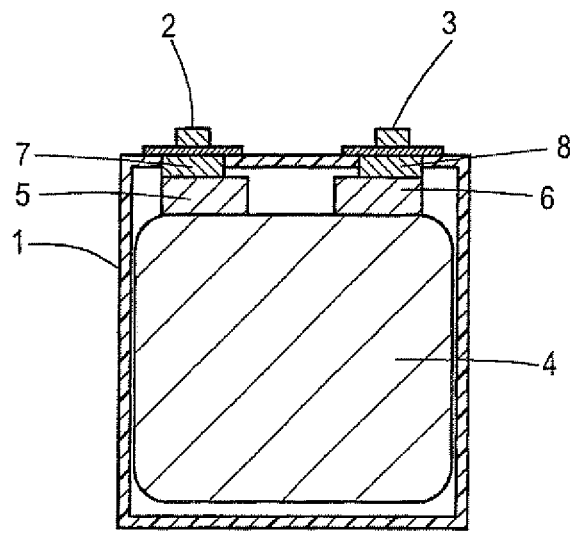
FIG. 1 a sectional view through a cell holder according to the invention in the form of a housing with integrated pouch cell of a first embodiment FIG. 2 a sectional view through a cell holder according to the invention with integrated pouch cell of a second embodiment, FIG. 3 a schematic diagram of a lithium mixed storage element according to the invention of a first embodiment, and FIG. 4 a schematic diagram of a lithium-mixed-storage element according to the invention of a second embodiment.

FIG. 1 shows a sectional view of a cell holder 1, which is configured as rectangular closed housing. It is preferably made of plastic and has contact interfaces 2, 3 on its top side in order to contact the pouch cell 4 situated in the cell holder with other lithium cells which are clamped into a cell block. The lithium pouch, cell 4 is received in the stable cell holder 1 as flexible cell, and has as is known two poles 5, 6 which are connected via contact elements 7, 8 with the contact interfaces 2, 3 of the cell holder 1

In this exemplary embodiment only one pouch cell 4 is received in the cell holder 1. When the pouch cell is sufficiently narrow it is conceivable to integrate a second or third one in the cell holder 1, given that the cell holder is wide enough.

Figure 2:
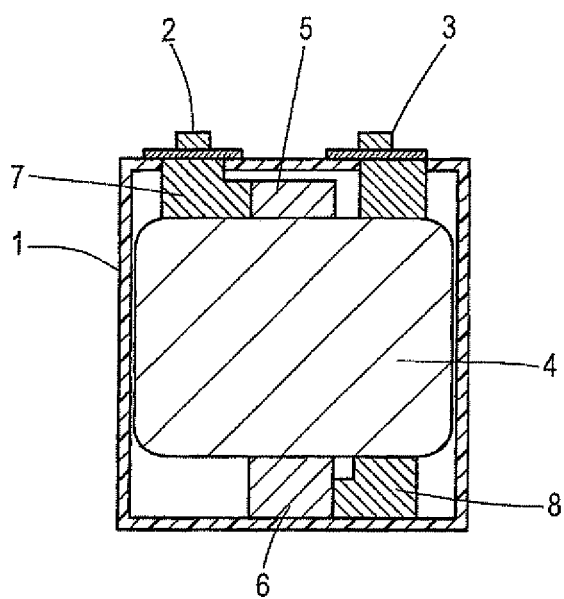

While in the exemplary embodiment according to FIG. 1 the two poles 5, 6 are situated at the same side of the pouch cell 4, FIG. 2 shows an exemplary embodiment in which the poles 5, 6 are provided at two opposing sides of the pouch cell 4. In this case the contact elements 7, 8 are correspondingly configured or respectively installed so that the poles 5, 6 can be connected with the corresponding contact interfaces 2, 3. Also in this case the pouch cell 4 for multiple pouch cells) is however received in a cell holder made of plastic configured in the manner of a closed housing, i.e., completely encapsulated.

The cell holder 1 is preferably configured two-part, made of the actual housing body and a cover, which is put on in a simple manner, in order to close the housing for forming the closed cell holder 1. It is conceivable to configure this closure non-detachable for example in that the two parts are welded to each other, which is particularly easy to accomplish since they are preferably made of plastic.

The dimensions of the cell holder 1, i.e., its length, width and height correspond to the outer dimensions of a prismatic cell. A prismatic cell has inherently a housing which has usually a rectangular shape, however it can of course also have other shapes, wherein then of course also the shape of the cell holder 1 is configured correspondingly so that a same geometry results.

Figure 3:
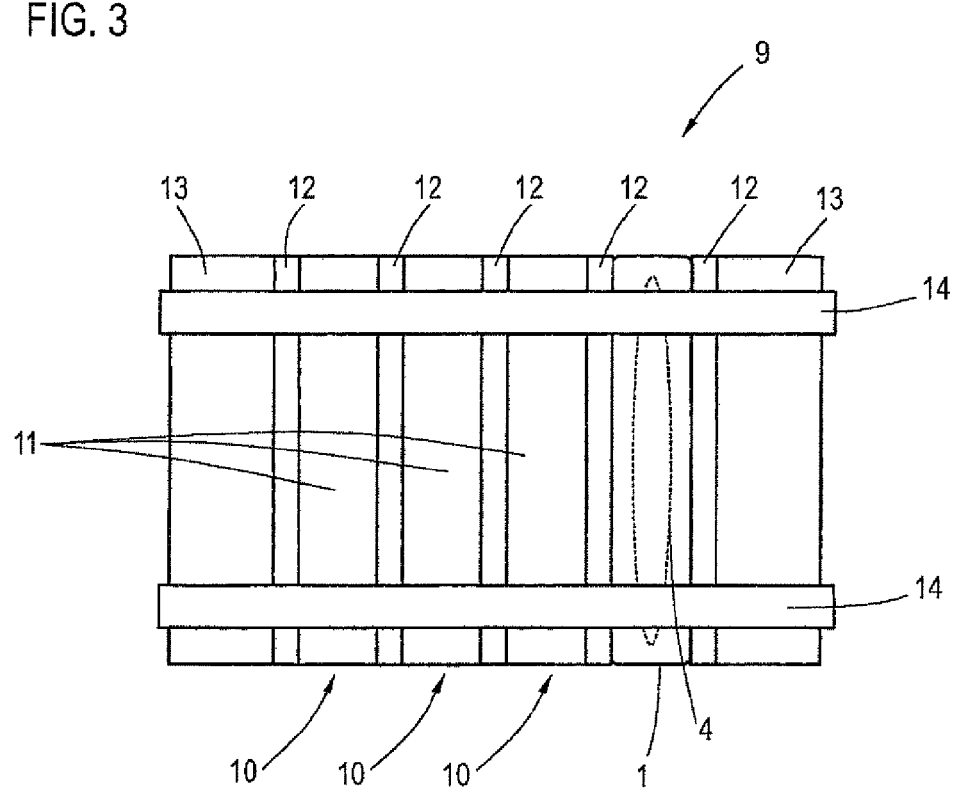

FIG. 3 shows an exemplary embodiment in which a storage element 9 is formed as cell block including prismatic cells 10 as well as a cell holder 1 with an integrated pouch cell 4, which is here only shown in dashed lines. As mentioned the outer dimensions of the cell holder 1 correspond to the outer dimension of the housing 11 of each prismatic cell, as shown in FIG. 3. They are also preferably of the same height, the same length and the same width. The housing provides the pouch cell 4 with sufficient stability so that the pouch cell 4 can be integrated in such a cell stack.

Between each respective two cells a distance plate 12 is arranged, further a distance plate 12 is also arranged between each endside cell and an endside clamping plate 13 thus resulting in an stack of alternating layers of clamping plates, distance plates and cells or cell holders results. This assembly is securely axially clamped via clamping means, here clamping bands 14.

Figure 4:
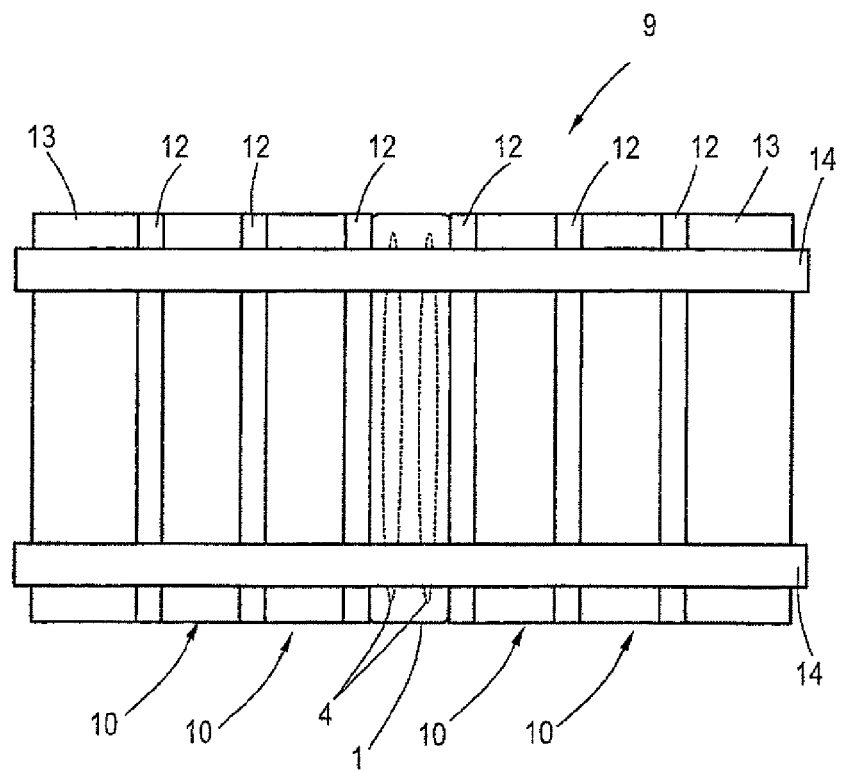

FIG. 4 shows a further embodiment of the exemplary configuration of a clamping element 9 in the form of a cell block. Again two endside clamping plates 13 are provided as well as a sequence of distance plates 12 and prismatic cells 10 and a cell holder 1 in which in the shown examples however two pouch cells 4 are arranged.

Even though FIG. 4 again shows the integration of only one cell holder 1, here however with two pouch cells 4, it is of course also conceivable to integrate multiple cell holders 1 each having one or multiple pouch cells 4. This means that the concrete configuration of the cell block and with this the storage element 9 can be freely chosen as desired.

Of course also the prismatic cells 10 have corresponding contact interfaces, these are positioned in the cell block at the same side as the contact interfaces 2, 3 of the or each of the cell holder 1 integrated in the cell block, so that all contact interfaces can be contacted with each other in a simple manner.

What is claimed is:

1. A storage element, comprising:
    plural lithium cells arranged as stack adjacent each other; and
    clamping plates arranged at respective end sides of the storage element, said lithium cells being clamped to each other via the clamping plates, said clamping plates being connected which each other via clamping elements,
    wherein the plural lithium cells comprise different types of lithium cells, said different types of lithium cells comprising prismatic cells and at least one pouch cell having flexible walls and being received in a cell holder constructed as a separate rigid housing closed from all sides, each of the prismatic cells comprising a separate rigid housing, with an outer dimension of the separate rigid housing of the at least one pouch cell corresponding to an outer dimension of the housing of the prismatic cells.

2. The storage element of claim 1, wherein one or multiple pouch cells are received in the cell holder.

3. The Storage element of claim 1, wherein the housings of the prismatic cells have contact elements and wherein the cell holder has further contact elements corresponding in construction and position to the contact elements of the prismatic cells.

4. The storage element of claim 1, further comprising a distance plate arranged between two of the plural lithium cells.

5. The storage element of claim 4, further comprising a clamping plate and a further said distance plate, said further distance plate being arranged between a respective outermost one of the lithium cells and the clamping plate.

6. The storage element of claim 1, wherein the clamping elements are configured as clamping bands.

* * * * *